United States Patent
Blasco Claret et al.

(10) Patent No.: US 9,660,892 B2
(45) Date of Patent: *May 23, 2017

(54) SYSTEM FOR SELECTIVELY UNIFYING OVERLAPPING NETWORKS TO COORDINATE COMMUNICATION CHANNEL USAGE

(71) Applicant: MARVELL HISPANIA, S.L., Madrid (ES)

(72) Inventors: Jorge Vicente Blasco Claret, Valencia (ES); Luis Manuel Torres Cantón, Valencia (ES); Oscar Gomez Vila, Valencia (ES); José Ruz Barrero, Burjassot (valencia) (ES)

(73) Assignee: MARVELL HISPANIA, S.L., Valencia (ES)

(*) Notice: Subject to any disclaimer, the term of this patent is extended or adjusted under 35 U.S.C. 154(b) by 0 days.

This patent is subject to a terminal disclaimer.

(21) Appl. No.: 14/810,374

(22) Filed: Jul. 27, 2015

(65) Prior Publication Data

US 2015/0333995 A1 Nov. 19, 2015

Related U.S. Application Data

(63) Continuation of application No. 13/001,345, filed as application No. PCT/ES2009/070231 on Jun. 16, 2009, now Pat. No. 9,094,833.

(30) Foreign Application Priority Data

Jun. 23, 2008 (ES) .................................. 200801866

(51) Int. Cl.
*H04J 1/16* (2006.01)
*H04L 12/26* (2006.01)
(Continued)

(52) U.S. Cl.
CPC ......... *H04L 43/0888* (2013.01); *H04B 3/542* (2013.01); *H04L 1/0001* (2013.01);
(Continued)

(58) Field of Classification Search
None
See application file for complete search history.

(56) References Cited

U.S. PATENT DOCUMENTS

| | | | |
|---|---|---|---|
| 6,088,335 A | 7/2000 | I et al. | |
| 9,094,833 B2 * | 7/2015 | Blasco Claret | ....... H04W 52/40 |

(Continued)

FOREIGN PATENT DOCUMENTS

| | | |
|---|---|---|
| ES | 2326054 | 9/2009 |
| KR | 100754224 B1 | 9/2007 |

(Continued)

OTHER PUBLICATIONS

Ayyagari, Deepak and Chan, Wai-chung, "A Coordination and Bandwith Sharing Method for Multiple Intergering Neighbor Networks", IEEE, 2004: 0-7803-8784-8/04, pp. 206-210 (in English).

(Continued)

*Primary Examiner* — Willie J Daniel, Jr.

(57) ABSTRACT

A system including first and second network nodes that communicate with additional nodes in first and second networks, respectively, using a shared communication channel. In response to detecting presence of the first network node, the second network node transmits a first signal to the first network node including a predetermined sequence known to both the first and second network nodes. The first network node measures a strength of the transmitted signal based on knowledge of the predetermined sequence and calculates a throughput metric (throughput referring to amount of information transmitted per second) based on the measured strength. In response to the throughput metric being less than a unification threshold, the first network node selectively transmits a unification request to the second network node. The unification request invites the second network node to coordinate operation with the first network (Continued)

node to reduce interference between the first network and the second network.

20 Claims, 5 Drawing Sheets

(51) Int. Cl.
    *H04W 52/40*     (2009.01)
    *H04L 1/00*     (2006.01)
    *H04B 3/54*     (2006.01)
    *H04W 16/14*     (2009.01)

(52) U.S. Cl.
    CPC ..... *H04W 52/40* (2013.01); *H04B 2203/5425* (2013.01); *H04W 16/14* (2013.01)

(56) References Cited

U.S. PATENT DOCUMENTS

| | | |
|---|---|---|
| 2007/0025384 A1 | 2/2007 | Ayyagari et al. |
| 2007/0058659 A1 | 3/2007 | Ayyagari et al. |
| 2007/0064783 A1 | 3/2007 | Kuroda et al. |
| 2007/0230497 A1 | 10/2007 | Choi et al. |
| 2008/0088418 A1 | 4/2008 | Sugita |
| 2009/0141821 A1 | 6/2009 | Blasco Claret et al. |

FOREIGN PATENT DOCUMENTS

| | | |
|---|---|---|
| WO | 2005/045689 A2 | 5/2005 |
| WO | 2007/059448 A1 | 5/2007 |
| WO | 2007/097671 A1 | 8/2007 |
| WO | WO-2007/113359 A1 | 10/2007 |
| WO | 2008/030934 A2 | 3/2008 |

OTHER PUBLICATIONS

Extended European Search Report for EP Application No. 09769383.2, dated Apr. 6, 2016, 12 pages.

Office Action for KR Application No. 10-2011-7001691, dated Mar. 20, 2015, 11 pages.

PCT International Search Report for PCT Application No. PCT/ES2009/070231, dated Nov. 12, 2009, 3 pages.

* cited by examiner

SYSTEM FOR SELECTIVELY UNIFYING OVERLAPPING NETWORKS TO COORDINATE COMMUNICATION CHANNEL USAGE

CROSS-REFERENCE TO RELATED APPLICATIONS

The present disclosure is a continuation of U.S. patent application Ser. No. 13/001,345 (now U.S. Pat. No. 9,094,833) filed on Nov. 29, 2011, which is a National Stage of International Application No. PCT/ES2009/070231, filed Jun. 16, 2009, which claims the benefit of Spanish Patent Application No. P200801866, filed Jun. 23, 2008. The entire disclosures of the applications referenced above are incorporated herein by reference.

FIELD

The present disclosure relates to network communication, and more particularly to systems and methods for sharing communication channels in a network.

BACKGROUND

In home network environment it is normal that multiple communication systems attempt to use the same means of transmission, such as for example, over-the-air (wireless networks) or a low voltage electrical network (power-line networks). In these case, neighboring networks, i.e., those networks that are separate from one's own network and that use the same shared means, produce interference that reduces the amount of information transmitted per second (throughput) achievable by the network itself.

Currently, neighboring networks may share time and frequency of the channel, dividing the capacity of the channel between the neighboring networks. The method of the disclosure is based on a different concept: allowing networks to produce controlled interference in part of the channel, with which greater efficiency is achieved even when neighboring networks are simultaneously transmitting.

In the state of the art, there are multiple methods to share means that achieve more or less acceptable results, depending on the application.

One of these methods is that published in the IEEE article, "A coordination and bandwidth sharing method for multiple interfering neighbor networks" by Ayyagari, D. Wai-chung Chan presented at the Consumer Communications and Networking Conference in 2005, where a method to permit network coordination without needing to exchange messages is described.

On the other hand, Patent US 2007/0230497 titled "Method and apparatus to negotiate channel sharing in PLC network" discloses a method in which a predefined time zone is used so that border nodes exchange messages using time division multiple access (TDMA).

There are also methods to distribute the channel frequency or time between different systems to avoid interference. This is the case of patent US2007/064783 A1 titled "Transmission/Reception apparatus and transmission/reception method for enabling coexistence of systems".

SUMMARY

A method for sharing a communication channel between a first network and a second network includes transmitting a signal from the second network to the first network in response to the second network detecting presence of the first network. The signal includes a predetermined sequence. The method includes measuring a strength of the signal arriving at the first network. The method includes transmitting a unification request from the first network to the second network when a metric based on the measured strength is less than a unification threshold. The unification request invites the second network to coordinate operation with the first network to reduce interference between the first network and the second network.

In other features, the communication channel is either a low voltage electrical network or a wireless medium. The method further comprises transmitting a second signal from the first network to the second network in response to the first network detecting presence of the second network. The second signal includes the predetermined sequence. The method includes measuring a second strength of the second signal arriving at the second network. When a second metric based on the second measured strength is less than the unification threshold, the method includes coordinating operation of the first and second networks under a single master node in response to the unification request.

In other features, the metric is based on a calculated throughput within the first network that accounts for an interfering effect based on the measured strength. The second metric is based on a second calculated throughput within the second network that accounts for a second interfering effect based on the second measured strength. When the second metric is greater than a quality threshold, the method includes reducing transmission power of the second network in response to the unification request. The quality threshold is higher than the unification threshold.

In other features, the method includes transmitting a power reduction request from the first network to the second network when the metric is greater than the unification threshold and less than the quality threshold. When the second metric is greater than the quality threshold, the method includes reducing transmission power of the second network in response to the power reduction request.

In other features, the method includes reducing transmission power of the second network by halting transmission using selected ones of a plurality of carriers to achieve a desired metric based on reduced power. The ones of the plurality of carriers are selected in decreasing order of power.

In other features, the method includes reducing transmission power of the second network by decreasing transmission power across all of a plurality of carriers. The method includes transmitting a unification request from the second network to the first network when the second metric is less than the unification threshold. When the metric is less than the unification threshold, the method includes coordinating operation of the first and second networks under the single master node in response to the unification request from the second network. The method includes transmitting a power reduction request from the second network to the first network when the second metric is greater than the unification threshold and less than the quality threshold. When the metric is greater than the quality threshold, the method includes reducing transmission power of the first network in response to the power reduction request from the second network. The signal comprises training frames.

In other features, the method includes dividing the communication channel into a coordinated zone and an uncoordinated zone. In the uncoordinated zone, the first network and the second network operate independently of each other.

In the coordinated zone, the first network and the second network are prevented from transmitting simultaneously. The communication channel is divided according to orthogonal codes, time, or frequency.

In other features, the coordinated zone includes a presence publication sub-zone and an information exchange sub-zone. The first network and the second network each announce their presence in the presence publication sub-zone. Information is selectively exchanged between the first network and the second network in the information exchange sub-zone. In response to the second network detecting presence of the first network, the method includes transmitting a message from the second network to the first network in the information exchange sub-zone. The message indicates a future time for transmitting the signal.

In other features, after waiting for a random time period from a beginning of the information exchange sub-zone, the method includes beginning transmission of the message when no incoming signal is detected at the second network. The message also indicates a duration for transmitting the signal. The message defines a new coordinated zone within the uncoordinated zone.

In other features, the method includes transmitting the signal from the second network to the first network in the new coordinated zone. The method includes dividing the presence publication sub-zone into a plurality of regions, transmitting presence information from the first network using a region of the plurality of regions, and transmitting presence information from the second network using a second region of the plurality of regions. The region and the second region are mutually exclusive.

In other features, the method includes listening for presence information at the first network in the plurality of regions other than the region; and listening for presence information at the second network in the plurality of regions other than the second region.

Further areas of applicability of the present disclosure will become apparent from the detailed description, the claims and the drawings. The detailed description and specific examples are intended for purposes of illustration only and are not intended to limit the scope of the disclosure.

DESCRIPTION

Figure 1:
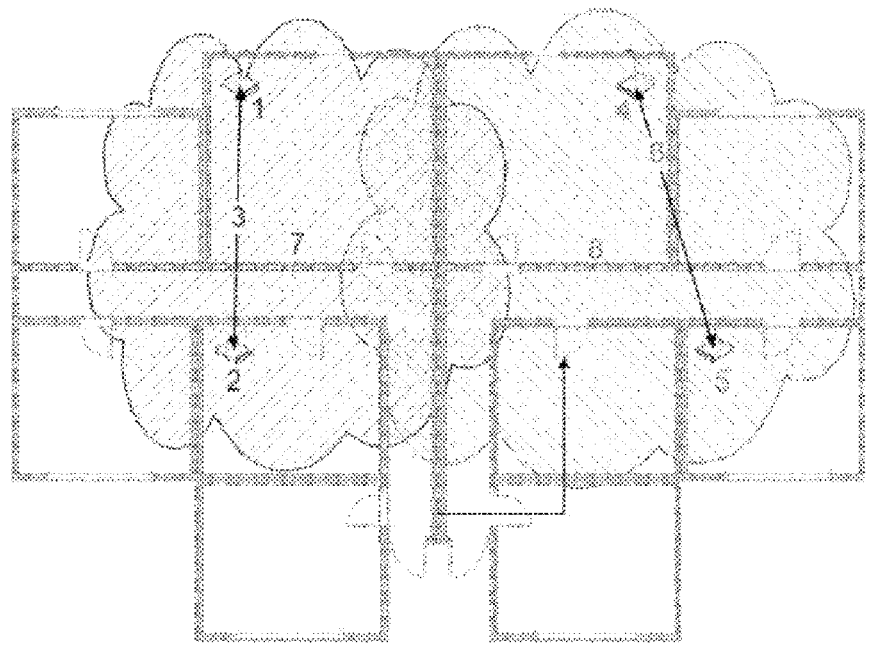
FIG. 1 shows an example of an embodiment with two master-slave networks that share the same means of transmission. The two networks are in adjacent apartments in the same building, and the shared means of transmission is the electrical network of said building.
Figure 2:
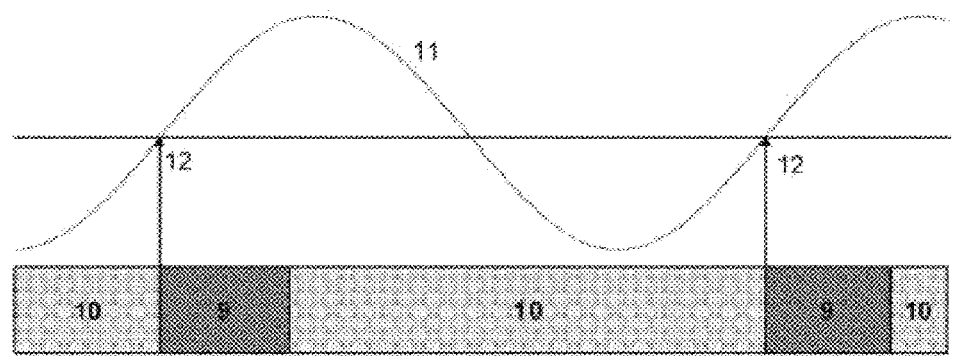
FIG. 2 shows a temporary location of coordinated zones and uncoordinated zones using an electrical power signal as reference.
Figure 3:
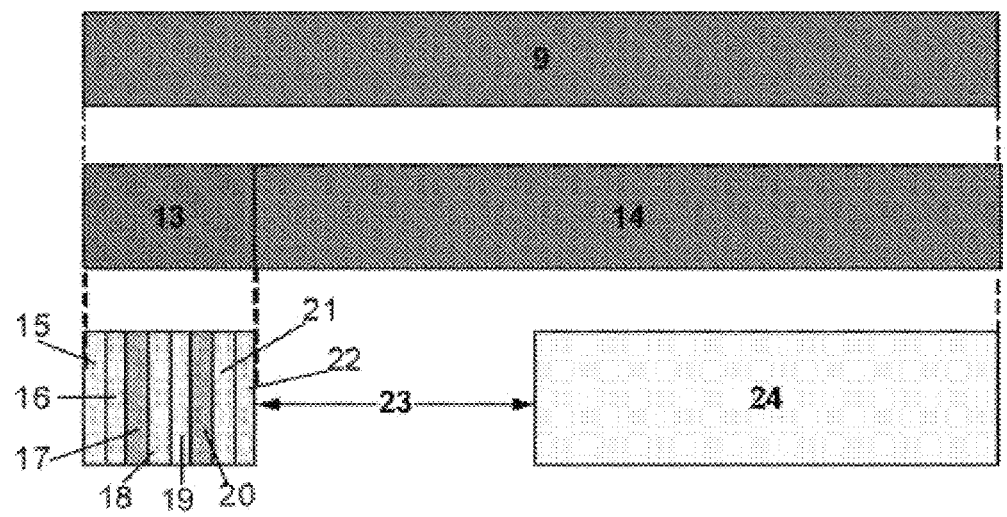
FIG. 3 shows subzones of a coordinated zone: a presence publication zone (with its regions) and an information exchange subzone.
Figure 4:
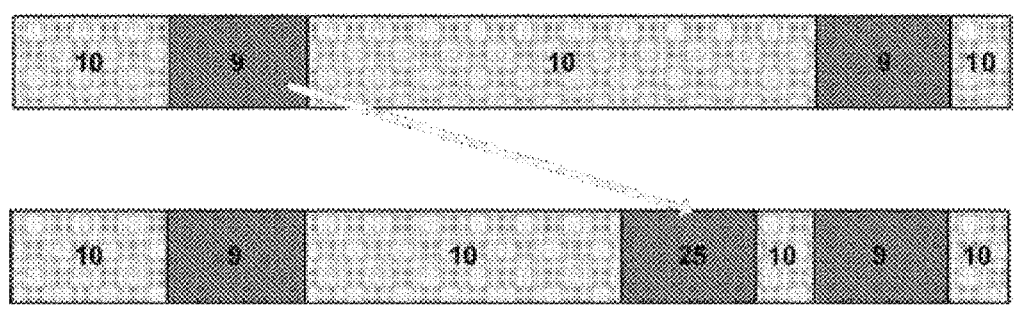
FIG. 4 graphically indicates how part of an uncoordinated zone is used for the transmission of a known sequence for calculation of an amount of information transmitted per second (throughput) while there is interference from a neighboring network.

This disclosure, as expressed in the wording of this descriptive report concerns a method for selectively sharing a communication channel between coordination and interference i.e., a method by which different networks will be coordinated in such a way that only one of them will be transmitting at a certain time, and the rest will receive, while at other times they will not be coordinated, so that the networks may transmit at the same time and produce interference between them.

Total coordination is unadvisable because only one network may simultaneously transmit on the shared channel, dividing the channel's capacity between the number of networks that share the channel; whereas a total lack of coordination is also unadvisable because the interference between networks may be so significant that reliable communication will not be obtainable. The method of the disclosure solves the problem of sharing a channel without drastically reducing the communication capacity, and consists of dividing the channel into coordinated zones and uncoordinated zones. The coordinated zones serve for network presence publication and for message exchange, while in the uncoordinated zones, the networks work independently and as if the networks were the only ones using the channel. The networks are able to reduce transmission power in the uncoordinated zones due to the information obtained from the coordinated zones, thus reducing interference between the networks until acceptable values are obtained for communication of the different networks.

The main advantage of this procedure is that the procedure avoids excessive coordination and reduces interference when multiple networks are transmitting at the same time on the channel. By doing this, it is possible to enhance the amount of information transmitted (throughput) overall by all the networks that use the same shared channel.

In any of the previous cases, said documents do not interfere with the novelty nor the inventive step of this disclosure, because the method described uses controlled interference for network transmission power to enhance the overall reutilization of the channel.

The procedure of this disclosure may be used in combination with the method presented in the Spanish patent, number 200600867 "Procedure for simultaneous transmission in time and frequency of multiple data communication via OFDM modulations" ("Procedimiento de transmisión simultáneo en tiempo y frecuencia de múltiples comunicaciones de datos mediante modulaciones OFDM"), so that when using the different network transmission modes, network control signals will not be detected by their neighboring networks.

To achieve the objectives and to avoid the disadvantages mentioned in the previous paragraphs, the disclosure consists of a procedure to selectively share a communication channel between coordination and interference. This procedure may be used when a channel shared among multiple communication networks and where each network contains one or more nodes that implement the procedure to share the channel. The procedure is characterized by the following steps: the communication channel is divided in one or more coordinated zones and one or more uncoordinated zones, where one coordinated zone is a zone that is free from interference; the presence of other networks is detected that use the same communication channel; the network signal power and the power of the interference are obtained via the transmission of known sequences on one or more of the coordinated zones on the communication channel; the network signal power is compared to the interference power, and the amount of information transmitted per second (throughput) with pre-set thresholds on each network; a decision is made regarding the need to link the communication network to other networks present on the communication channel by comparing these with the network thresholds pre-set for this purpose; and finally, a decision is made on the need to reduce interference by comparing the network thresholds pre-set for this purpose. The method can maximize the aggregate of information transmitted by multiple networks using the same communication channel.

In many cases, two or more different networks using the same communication channel implement the same communication protocol, which makes information exchange possible between these networks, but it will also be necessary to include mechanisms to avoid control signal detection that come in from neighboring networks.

The procedure is based on the partition of the communication channel into coordinated zones and uncoordinated zones selectively implemented in time, frequency, and orthogonal codes (CDMA), using a signal that is external to the network as a common reference between the different networks, such as for example the zero-crossing of the power signal from an electric network in power-line networks, or a signal transmitted by one or more nodes indicating the beginning of the partition.

In the coordinated zones there is no interference between networks, i.e., at the same time, frequency, or orthogonal code, depending on whether the channel partition has been implemented in time, frequency, or orthogonal codes; since there is only one network transmitting and the rest of the networks that use the same communication means only receive information.

On the other hand, in the uncoordinated zones, the networks use the communication channel independently and without taking into account the presence of the other networks, so that the signals that come in from other networks will be seen as noise by the receiver.

Generally speaking, there are two ways to divide the communication channel into coordinated zones and uncoordinated zones, in which the division can be either fixed or not fixed. In the event that the division is fixed, each node will know when the start moment will occur and what the duration of each zone is in advance. Said scheduling may be dependent upon the number of networks and the number of nodes in each network using the same means of communication.

In another case, i.e., when the divisions into coordinated zones and uncoordinated zones are not fixed, said division and the sizes of the different zones are published in one or more coordinated zones (so that this information may be received without interference). For this reason, the quantity and size of the coordinated zones in the channel are not pre-set. If, in each channel partition there is at least one coordinated zone, and it is desired to include a new coordinated zone, it is possible to transmit a reserve message in at least one coordinated zone prior to inclusion of the new coordinated zone, in which the message indicates the position and the size of the new coordinated zone.

In the event that the networks use the same communication protocol, it is necessary to include procedures to avoid detection in the uncoordinated zones of said communication protocol control signals. If this is not done, the control signals from the other network might be interpreted as being its own, producing communication errors. Among these procedures, the simultaneous use of different transmission modes in time and frequency, multiplexing in orthogonal codes (CDMA), and spatial subchannels stand out.

Coordinated zones serve to publish the presence of networks on the shared channel as well as for the exchange of information between the networks. For this reason, in one possible embodiment, one or more coordinated zones contain at least one subzone for publication of the presence of the network and another subzone for the exchange of information between different networks.

In order to publish presence, the subzone for publication of presence on the network may be selectively divided into different regions in frequency, time, and orthogonal codes. Each network can transmit previously specified signals to indicate its presence in the region assigned to said network, so that one network detects the presence of other networks upon receiving said signals in regions where the network itself has not transmitted.

One alternative to the publication of presence which does not need the division into regions of the presence publication subzone, consists of the network using a Carrier Sense Multiple Access (CSMA) in the presence publication subzone and only the winner publishes its presence. On the other hand, it is necessary to ensure that only one network simultaneously transmits in the information exchange subzone. For this, the networks may only transmit in the information exchange subzone after selectively acquiring access thereto via the Carrier Sense Multiple Access (CSMA) procedure, via a pre-set order among the networks or via an order set by a coordinating network.

The method of the disclosure is based on controlling the power of the network transmission to obtain an optimal overall amount of information transmitted per second (throughput) in the different networks. To calculate this value, a sequence selectively known by the different networks through a network node, by all the nodes in the network, or by a finite number of network nodes at the same time in the information exchange subzone of the coordinated zone of the communication channel. Each network will also have two thresholds—a higher threshold referred to as "the quality threshold", and a lower threshold referred to as "the unification threshold"—that will be used to determine whether other networks should be asked to reduce their transmission power or that they link thereto.

If the amount of information transmitted per second (throughput) by a network is below the pre-set quality threshold in the presence of interference produced by neighboring networks, said network will send a message in the information exchange subzone of at least one coordinated zone so that the interfering networks reduce their transmission power.

On the other hand, if the amount of information transmitted per second (throughput) by a network is above the pre-set quality threshold and the network receives a message to reduce its transmission power, the network will reduce the power of transmission until the amount of information transmitted per second (throughput) by the network decreases to its quality threshold.

Regarding the other threshold, if the amount of information transmitted per second (throughput) by a network is below the pre-set threshold of unification, the network will decide to link or exchange coordination messages in information exchange subzones of one or more coordinated zones with a neighboring network for the purpose of coordination.

In the same fashion, if the amount of information transmitted per second (throughput) by a network is below the pre-set threshold of unification and the network receives a message to coordinate with a neighboring network, the network will accept the message to coordinate and will exchange coordination messages in information exchange subzones of one or more coordinated zones with a neighboring network for the purpose of coordination.

The manner of coordination will depend upon whether or not the two networks use the same communication protocol. If the same communication protocol is being used and in one possible embodiment, coordination messages will be sent to select a single node that will take charge of distributing the communication channel in the network selectively unified in time, frequency, orthogonal code, and a combination of these.

In systems whose the physical level of modulation is a multi-carrier, the power adjustment may be optimized from carrier to carrier. If the network uses a multi-carrier communication network and the network decides to reduce its power to a certain value, the power adjustment will consist of reducing the power in one or more carriers until the amount of information transmitted per second (throughput) obtained reaches the pre-set threshold.

The order in which the power of the different carriers is reduced is important for controlling the total amount of information transmitted per second. In one possible embodiment, the carriers are arranged from lower to higher signal-to-noise ratio detected in this carrier and the carrier to carrier power is reduced using the order specified in said list until the amount of information transmitted per second (throughput) is reduced by the network to its quality threshold.

In another embodiment, the carriers are arranged from higher to lower according to the power detected from the adjacent networks in the carriers, and the transmission power is reduced using the order specified in said list.

Below, to facilitate greater comprehension of this descriptive report and forming an integral part thereof, a few Figures are attached which in their non-limitative and illustrative character are shown as a representation of the object of the disclosure.

Following a description will be give of several examples of embodiments of the disclosure, referencing the numbering found in the examples.

The problem that the method of the disclosure wishes to resolve, from the theoretical point of view, consists of optimizing the overall amount of information transmitted per second by several systems that share the same means of communication. Let us suppose that for the examples of embodiments the scenario of FIG. 1, where there are two master-slave networks (7 and 8) in adjoining apartments in the same building, that implement the same multi-carrier communication system and that share the same means, in this case, a low voltage electrical network. The first network (7) is formed by two pieces of equipment called nodes, one that acts as master (1) and the other that acts as slave (2), that communicate (3) with each other through a shared means. Furthermore, the second network (8) is formed by two pieces of equipment, one that acts as master (4) and the other that acts as slave (5), that communicate (6) with each other through the same shared means.

Both networks use the method of the disclosure dividing the channel in time in order to have coordinated zones (9) and others that are not coordinated (10).

In the coordinated zones, only one of the two networks (7 or 8) will transmit simultaneously. The beginning of each coordinated zone is marked by a zero-crossing of the positive side of the 50 Hz (12) electrical power signal and said zone is divided into two sub-zones, one for presence publication (13) and the other for the exchange of information (14) between networks (7,8).

In another possible embodiment, one node would transmit a signal that is periodically pre-set. The rest of the nodes synchronize with said signal that would mark the beginning of the cycle.

In another example of an embodiment, the channel may be divided in frequency. On one frequency band each network could transmit without taking into account the other networks and on the other band the networks must coordinate when transmitting so that only one of the networks will transmit each time.

In this example of an embodiment, the sub-zone for presence publication (13) is divided into eight different regions (15 to 22). Each network selects one of these regions and transmits a signal known in each region. In this exact case, the first network (7) uses the third region (17) for presence publication, while the second network (8) uses the sixth region (20). When a coordinated zone arrives, the networks will transmit the signal known in said regions and will listen in the others, which will allow each network to know that there is another network that is transmitting on the same channel. On the other hand, to access the zone for the exchange of information (14) between the networks; which wait for a random time period (23) and after that period ends, if no signal is detected on the network, they will use said exchange of information zone (14) to transmit its message (24).

In the uncoordinated zones (10), each of the networks (7 and 8) act independently, but to avoid detection of control signals from the neighboring network, they will use different methods of simultaneous transmission in time and frequency (in this example of an embodiment, the method of the Spanish patent "Procedure for Simultaneous Transmission in Time and Frequency of Multiple Data Communication Via OFDM Modulations" ["Procedimiento de transmisión simultáneo en tiempo y frecuencia de múltiples comunicaciones de datos mediante modulaciones OFDM"]—application number P200600867—is used).

When the network (7) detects that there is another neighboring network (8) sharing the channel the network (7) signals to its nodes (1 and 2) that they must transmit a known sequence so that the other network (8) measures the interfering power that is arriving thereto. This known sequence is what we call below "training frames". To be able to send the sequence, one of the network nodes (in this embodiment example, in node 1) contend to obtain access to the information exchange zone (14) and within the information exchange zone (14), transmits a message (24) indicating the future moment and the duration in a new coordinated zone (25) in which its network nodes will transmit the known sequence (training frames) consecutively. In this example of an embodiment, each network node (7) transmits the training frames consecutively, i.e., first the master (1) and then the slave (2). Another option consists of transmitting the training frames simultaneously throughout the network nodes, so that time is saved, but accuracy is lost.

This process is also implemented by the other network (8) so that its neighbor may make measurements while there is interference following the same steps: struggle to use the information exchange zone, transmit the known sequence, etc.

In another example of an embodiment, the time in which the training frames are transmitted is pre-set so that each node knows in advance when the node is going to transmit the training frame, and therefore it is not necessary to announce that the frames are going to be transmitted. The situation of these transmissions is set but dependent on the number of networks and on the number of nodes present in each network. Therefore, the message exchange zone (14) is used so that each network announces its number of nodes, so that each node may consult its pre-programming to know when to transmit the training sequences.

Figure 10:
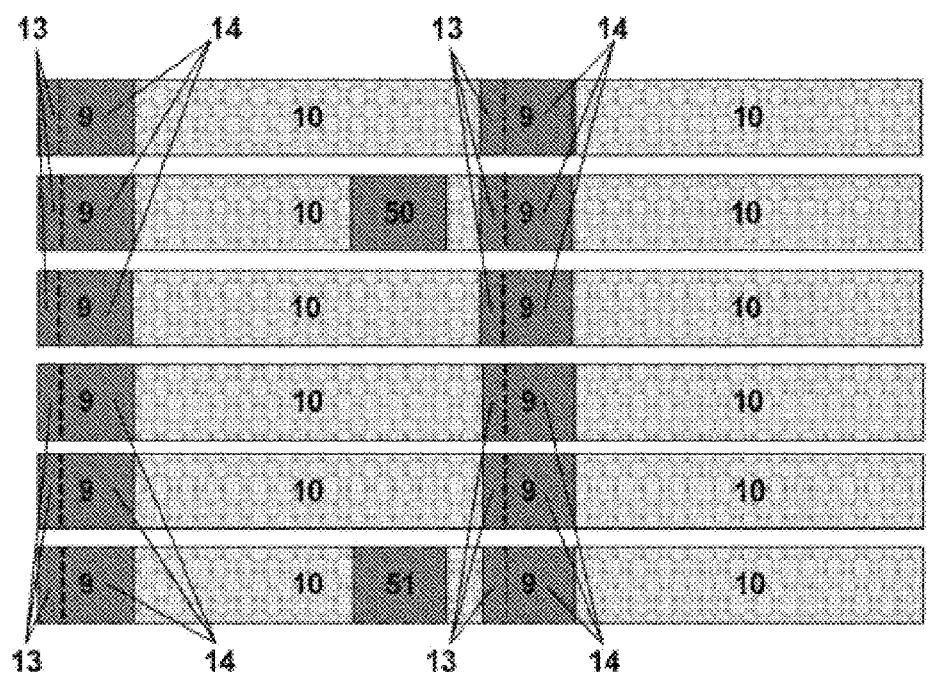
FIG. 10 shows an example in which the situation and size of coordinated zones and uncoordinated zones are pre-set.

FIG. 10 illustrates an example with the pre-programmed sequence for two networks with two nodes each. The pre-programmed sequence consists of twelve electrical power signal cycles of 50 Hz that are repeated cyclically. The first network (7) transmits its training frames in a pre-set zone (50), and the second network (8) transmits the training frames in another different pre-set zone (51). The zone for publishing presence (13) and the zone for the exchange of information (14) are used in the same manner as described previously.

Figure 6:
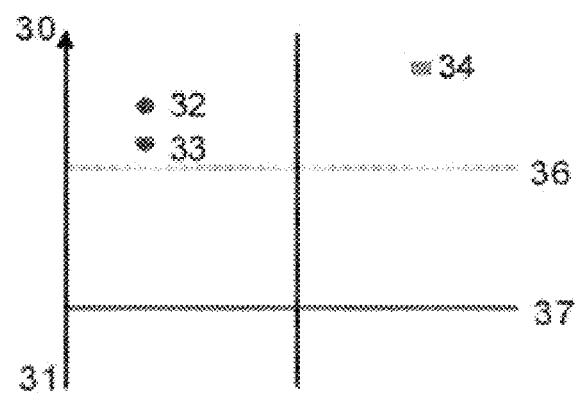
FIG. 6 graphically shows an amount of information transmitted per second (throughput) in the presence of the thresholds of the procedure as an example of two networks which are above the quality threshold.
Figure 7:
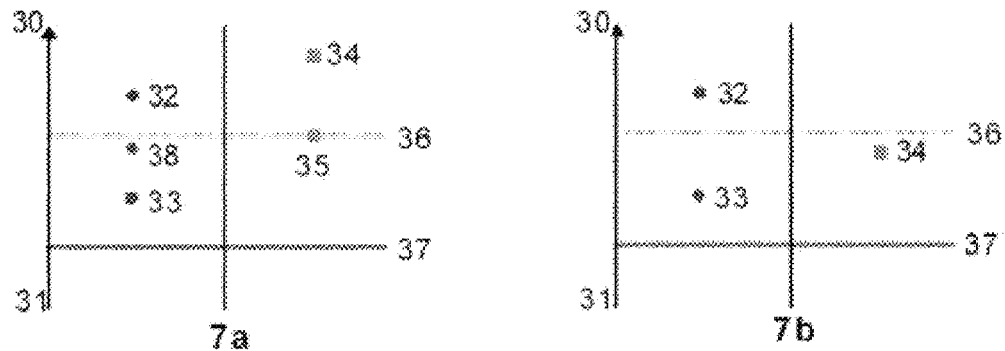
FIG. 7 shows another example in which a throughput of a network is below a quality threshold. If a throughput of a neighboring network is above said threshold, then the reduction in power (7a) applies; and if the throughput of the neighboring network is below said threshold, then no action is taken (7b).
Figure 8:
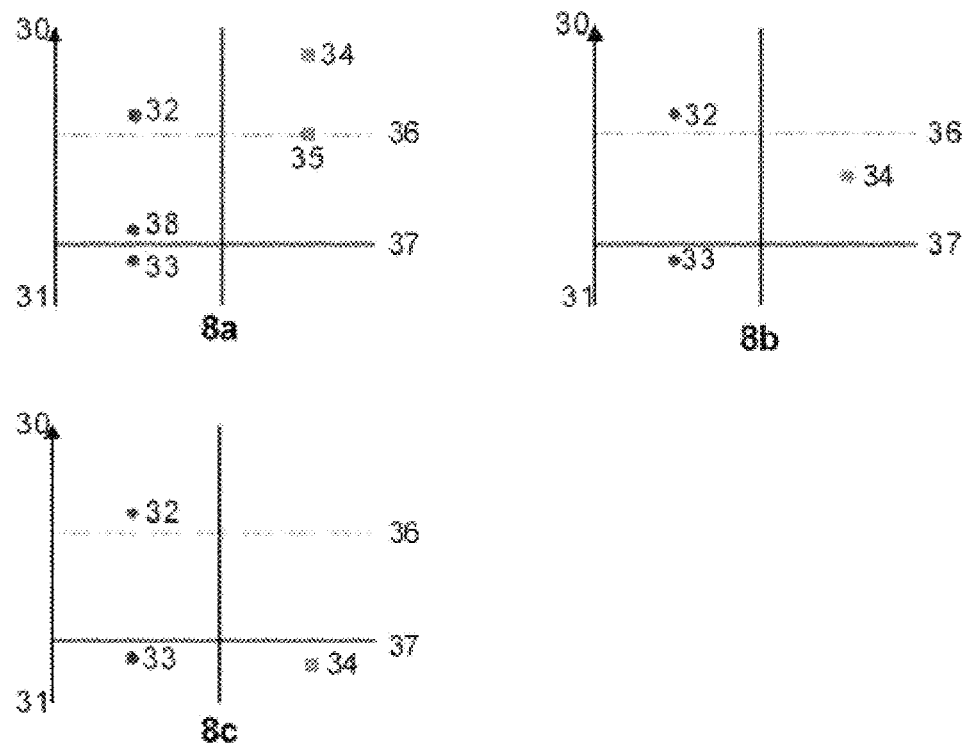
FIG. 8 shows another example in which a throughput of a network is below a threshold of unification. If a throughput of a neighboring network is above the quality threshold, power reduction applies (8a), if the throughput of the neighboring network is below the quality threshold, but above the threshold of unification, nothing need be done (8b), and if the throughput of the neighboring network is below the threshold of unification, then both networks will coordinate (8c).

When the method of the disclosure is used, each network needs to compare the amount of information transmitted per second (throughput) in the presence of interference and without interference in the presence of quality thresholds. In FIGS. 6, 7, and 8 the amount of information transmitted per second (throughput) from the first network (7) is shown before (32) and after (33) calculating the influence of the interference. The amount of information transmitted per second (throughput) from the second network (8) is also shown with interference (34), and the final state (38) of the first network if the second network performs any power reduction and the final state (35) of the second network in this case. The vertical axis in all the graphs in FIGS. 6, 7, and 8 is the amount of information transmitted per second (throughput) measured in megabits per second (30), where the zero position (31) is located in the lower part. The position of the quality thresholds (36) and unification (37) can also be seen graphically.

Following with these examples, upon receiving the known sequence, the network (7) will calculate the amount of information transmitted per second (throughput) that will be reduced in the presence of this interference (33). Once this value is known, the network (7) will compare the calculated throughput with the two thresholds that have been configured in the system: the quality threshold (36) and the threshold of unification (37).

In the case that the amount of information transmitted per second (throughput) after (33) calculating the influence of the interference is greater than the quality threshold (36), the interference of the second network (8) does not adversely affect communication of the network itself in a serious manner (7), so it is not necessary to make any change. This case appears in FIG. 6. If the throughput is lower than the quality threshold, but higher than the unification threshold (37), the network (7) will request that its neighboring network (8) reduce its power (to reduce the interference that the network (7) is undergoing) accessing the information exchange zone and sending the request. Upon receiving the request from the neighboring network (8), the network (7) will reduce its transmission power as long as the amount of information transmitted per second (throughput) of the second network receiving interference (calculated) (34) is above its quality threshold (36) as shown in FIG. 7a. This power reduction will never be so high that the amount of information transmitted per second corresponding to the final state (35) of the second network falls below the network quality threshold. FIG. 7b shows the case in which the amount of information transmitted per second of the second network receiving interference (34) is lower than the quality threshold (36), in which case, power reduction does not take place.

Figure 5:
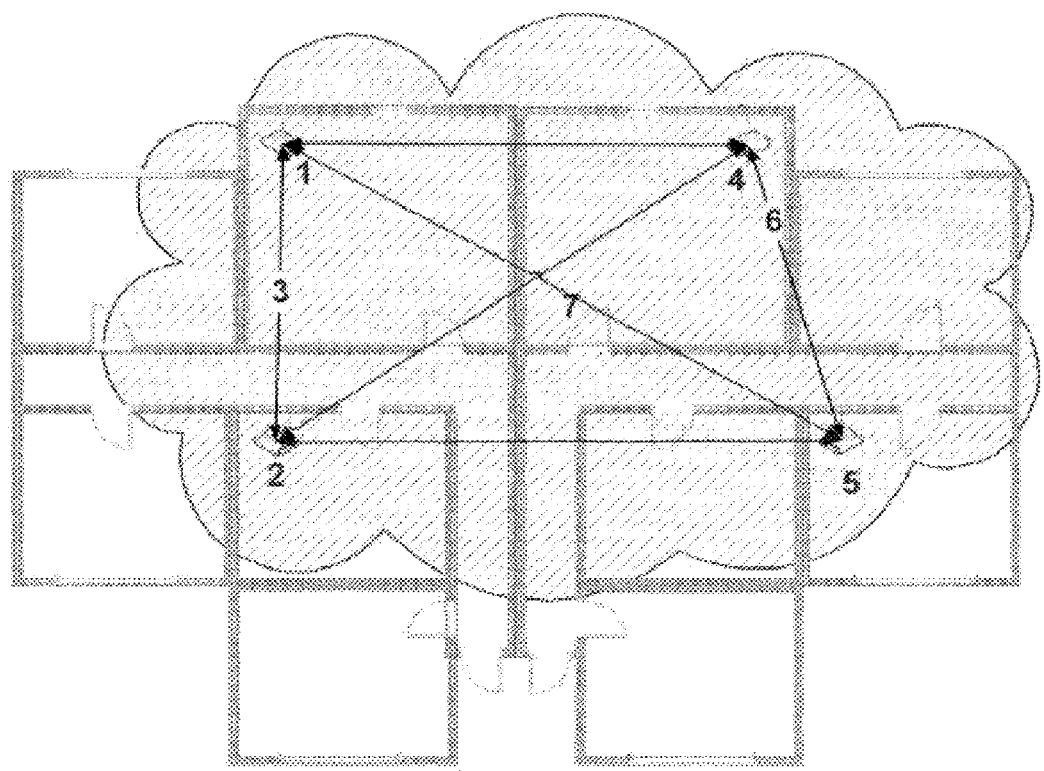
FIG. 5 shows an example of an embodiment in which two master-slave networks, that share the same means of transmission, have coordination to form a single network.

In the case in which the amount of information transmitted per second (throughput), after (33) calculating the influence of the interference, is lower than the threshold of unification (37) of the network, the network (7) will request its neighboring network (8) to effect a coordination between themselves, accessing the information exchange zone (14) and sending a message (24) with the request. This case may be seen in FIG. 8. If the neighboring network (8) also has an amount of information transmitted per second (34) below the threshold of unification (37), as may be seen in FIG. 8c, the unification will be accepted and the message exchange will begin so that both networks may act in coordination with a single coordinating or master node. In FIG. 5, the unification of the network may be seen, in which the unified network coordinating or master node (7+8) will be the master node (1) of the first network.

On the other hand, if the neighboring network (8) has an amount of information transmitted per second above the threshold of unification (37), the neighboring network (8) will interpret the coordination request as a request for power reduction and will act in the same manner as that presented above in FIG. 7, i.e., if the calculated amount of information transmitted per second (throughput) (34) is above its quality threshold (36) the network will reduce power, as may be seen in FIG. 8a, while if the throughput is between the quality (36) and unification thresholds (37), no reduction will take place, as may be seen in FIG. 8b.

Figure 9:
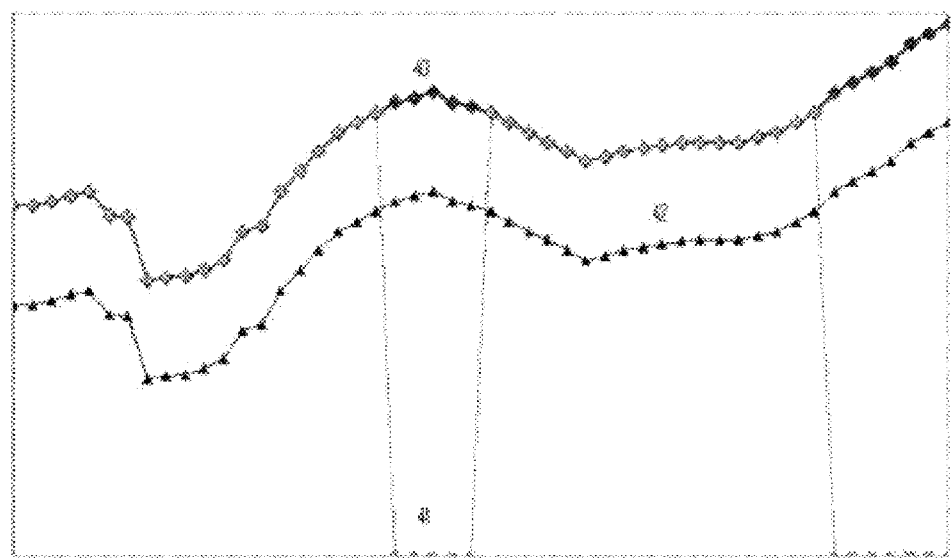
FIG. 9 shows a power received graph including one trace depicting spectral content where power is not reduced and two traces respectively depicting spectral content for two modes of power reduction.

If the result of the procedure is that it is necessary to reduce the power and the system is a multi-carrier, there are multiple ways to carry out said reduction. In an example of an embodiment, the carriers arrange themselves from higher to lower with respect to the power received from the neighboring network (during the transmission of the known sequences or training frames) and the carriers are removed in this order until the amount of information transmitted per second is correct (i.e., the amount of information transmitted per second remains above the network's quality threshold). FIG. 9 shows the carrier to carrier power before reduction (40) and after reduction in the manner indicated above (41). The result is a spectral hole in the reduced carriers.

This is not the only way to reduce power. FIG. 9 illustrates another method of reducing power, in which the method includes reducing the overall power by equally decreasing the power in each carrier (42), or even by using alternative arrangements between carriers.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A system comprising:
a first network node configured to communicate with at least one additional node in a first network using a communication channel; and
a second network node configured to (i) communicate with at least one additional node in a second network using the communication channel, and (ii) in response to detecting presence of the first network node, transmit a first signal to the first network node, wherein
the first signal includes a predetermined sequence,
content of the predetermined sequence is known to both the first network node and the second network node,
the first network node is configured to (i) measure a strength of the transmitted signal based on knowledge of the content of the predetermined sequence, (ii) calculate a throughput metric based on the measured strength, and (iii) selectively transmit a unification request to the second network node in response to the throughput metric being less than a unification threshold,
throughput refers to amount of information transmitted per second, and
the unification request invites the second network node to coordinate operation with the first network node to reduce interference between the first network and the second network.

2. The system of claim 1, wherein the communication channel is a wired electrical network or a wireless medium.

3. The system of claim 1, wherein:
the first network node is configured to transmit a second signal to the second network node in response to the first network node detecting presence of the second network node;
the second signal includes the predetermined sequence; and
the second network node is configured to (i) measure a second strength of the second signal based on knowledge of the content of the predetermined sequence, (ii) calculate a second throughput metric based on the second measured strength, and (iii) in response to the second throughput metric being less than the unification threshold when the unification request is received from the first network node, coordinate operation of the first and second networks under a single master node.

4. The system of claim 3, wherein:
the throughput metric accounts for an interfering effect of the second network based on the measured strength; and
the second throughput metric accounts for an interfering effect of the first network based on the second measured strength.

5. The system of claim 3, wherein:
the second network node is configured to, in response to the second throughput metric being greater than a quality threshold when the unification request is received from the first network node, reduce transmission power of the second network; and
the quality threshold is higher than the unification threshold.

6. The system of claim 5, wherein the first network node is configured to, in response to the throughput metric being greater than the unification threshold and less than the quality threshold, transmit a power reduction request to the second network node.

7. The system of claim 6, wherein the second network node is configured to, in response to the second throughput metric being greater than the quality threshold when the power reduction request is received from the first network node, reduce transmission power of the second network.

8. The system of claim 7, wherein the second network node is configured to (i) determine a desired throughput metric that will reduce transmission power of the second network, (ii) halt transmission in the second network over ones of a plurality of carriers of the communication channel, and (iii) cumulatively select the ones of the plurality of carriers, in decreasing order of power, until the desired throughput metric is reached.

9. The system of claim 7, wherein the second network node is configured to reduce transmission power of the second network includes decreasing transmission power across all of a plurality of carriers.

10. The system of claim 5, wherein:
the second network node is configured to (i) transmit a unification request to the first network node in response to the second throughput metric being less than the unification threshold and (ii) transmit a power reduction request to the first network node in response to the second throughput metric being greater than the unification threshold and less than the quality threshold; and
the first network node is configured to (i) in response to the throughput metric being less than the unification threshold when the unification request is received from the second network node, coordinate operation of the first and second networks under the single master node and (ii) in response to the throughput metric being greater than the quality threshold when the power reduction request is received from the second network node, reduce transmission power of the first network.

11. The system of claim 1, wherein the first signal comprises at least one training frame.

12. The system of claim 1, wherein:
the communication channel includes a coordinated zone and an uncoordinated zone;
in the uncoordinated zone, the first network node and the second network node operate independently of each other; and
in the coordinated zone, the first network node and the second network node are prevented from transmitting simultaneously.

13. The system of claim 12, wherein the communication channel is divided between the coordinated zone and the uncoordinated zone according to at least one of orthogonal codes, time, and frequency.

14. The system of claim 12, wherein:
the coordinated zone includes a presence publication sub-zone and an information exchange sub-zone;
the first network node is configured to announce presence of the first network node in the presence publication sub-zone;
the second network node is configured to announce presence of the second network node in the presence publication sub-zone; and
information is selectively exchanged between the first network node and the second network node in the information exchange sub-zone.

15. The system of claim 14, wherein:
the second network node is configured to, in response to detecting presence of the first network node, transmit a message to the first network node in the information exchange sub-zone; and
the message indicates a future time for transmitting the first signal.

16. The system of claim 15, wherein the second network node is configured to (i) wait for a random time period commencing at a beginning of the information exchange sub-zone and (ii) after waiting for the random time period with no incoming signal having been detected at the second network node, commence transmission of the message.

17. The system of claim 15, wherein the message (i) indicates a duration for transmitting the first signal and (ii) defines a new coordinated zone within the uncoordinated zone.

18. The system of claim 17, wherein the second network node is configured to transmit the first signal to the first network node within the new coordinated zone.

19. The system of claim 14, wherein:
the presence publication sub-zone is divided into a plurality of regions;
the first network node is configured to transmit presence information using a first region of the plurality of regions;
the second network node is configured to transmit presence information using a second region of the plurality of regions; and
the first region and the second region are mutually exclusive.

20. The system of claim 19, wherein:
the first network node is configured to listen for presence information in the plurality of regions other than the first region; and
the second network node is configured to listen for presence information in the plurality of regions other than the second region.

\* \* \* \* \*